(12) United States Patent
Eddington et al.

(10) Patent No.: US 7,618,470 B2
(45) Date of Patent: Nov. 17, 2009

(54) CYCLONIC SEPARATING APPARATUS

(75) Inventors: Robin Eddington, Wiltshire (GB); Benjamin John Strutt, Newcastle Upon Tyne (GB)

(73) Assignee: Dyson Technology Limited, Wiltshire (GB)

( * ) Notice: Subject to any disclaimer, the term of this patent is extended or adjusted under 35 U.S.C. 154(b) by 582 days.

(21) Appl. No.: 10/574,263

(22) PCT Filed: Oct. 11, 2004

(86) PCT No.: PCT/GB2004/004303

§ 371 (c)(1),
(2), (4) Date: Oct. 13, 2006

(87) PCT Pub. No.: WO2005/053855

PCT Pub. Date: Jun. 16, 2005

(65) Prior Publication Data

US 2007/0079579 A1    Apr. 12, 2007

(30) Foreign Application Priority Data

Nov. 8, 2003  (GB) .................................. 0326102.1

(51) Int. Cl.
*B01D 45/12* (2006.01)

(52) U.S. Cl. .................... 55/337; 55/345; 55/459.1; 55/DIG. 3

(58) Field of Classification Search ............... 55/337, 55/343, 345, 346, 459.1, DIG. 3
See application file for complete search history.

(56) References Cited

U.S. PATENT DOCUMENTS

| 4,349,360 A | | 9/1982 | Schuurmans | |
|---|---|---|---|---|
| 4,648,890 A | | 3/1987 | Kidwell | |
| 5,846,273 A | * | 12/1998 | Dyson | 55/337 |
| 6,251,168 B1 | | 6/2001 | Birmingham | |
| 6,425,931 B1 | * | 7/2002 | Croggon | 55/414 |

FOREIGN PATENT DOCUMENTS

| EP | 0042723 A2 | 12/1981 |
|---|---|---|
| EP | 0800359 | 7/1996 |
| FR | 2836360 A1 | 8/2003 |
| GB | 2355391 A | 4/2001 |
| GB | 2360960 A | 10/2001 |
| GB | 2360961 A | 10/2001 |
| WO | WO-96/19936 A1 | 7/1996 |

* cited by examiner

*Primary Examiner*—Robert A Hopkins
(74) *Attorney, Agent, or Firm*—Morrison & Foerster LLP

(57) ABSTRACT

A separating apparatus includes a separating chamber in which cyclonic separation is able to take place, an inlet to the separating chamber and a shroud that includes a wall having a multiplicity of through-holes forming an outlet from the separating chamber and also includes a lip extending from the wall into the separating chamber, the lip having has a plurality of apertures therethrough. The provision of apertures in the depending lip allows the airflow to be drawn through the apertures while it is still in the separating chamber. This has the effect of capturing some of the dirt and dust which remains entrained within the airflow so that it collects on the upstream side of the lip. Thus the shroud through-holes are presented with less entrained dirt and dust and the risk of the through-holes becoming blocked is reduced.

20 Claims, 4 Drawing Sheets

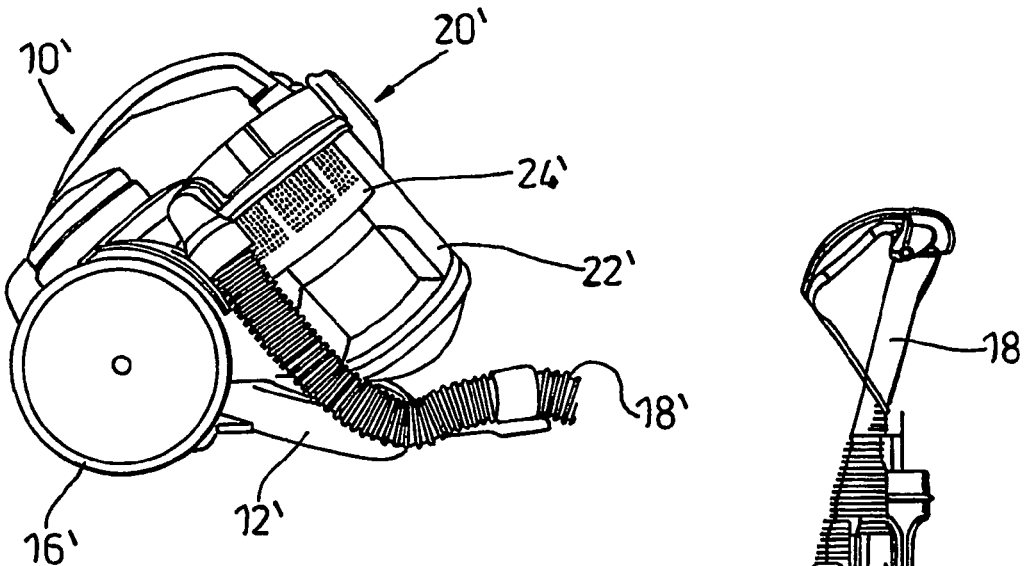
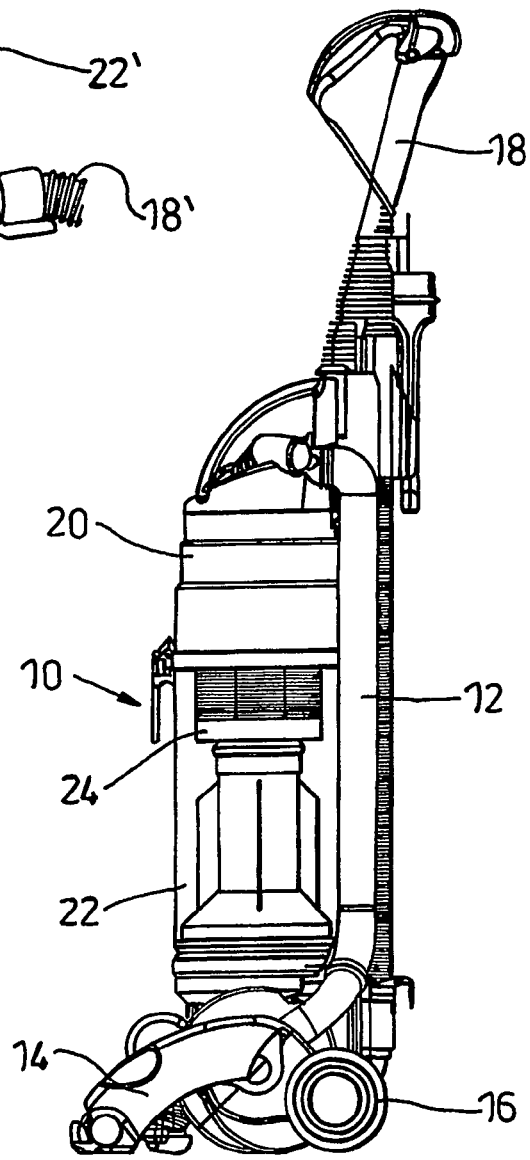
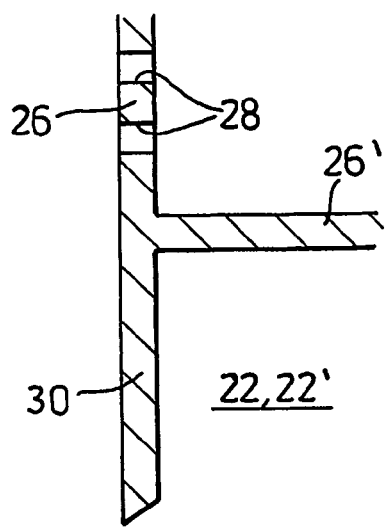
Fig. 1b
Fig. 1c
Fig. 1a

CYCLONIC SEPARATING APPARATUS

FIELD OF THE INVENTION

The invention relates to separating apparatus for separating dirt and dust from an airflow. Particularly, but not exclusively, the invention relates to separating apparatus suitable for use in a cyclonic vacuum cleaner.

BACKGROUND OF THE INVENTION

It is known to provide vacuum cleaners with cyclonic separating apparatus for separating dirt and dust from an airflow. It is also known to provide such separating apparatus with two cyclones arranged in series, the upstream cyclone being of relatively low efficiency and the downstream cyclone being of higher efficiency. Such an arrangement is shown and described in EP 0 042 723. It has been found to be beneficial if a so-called shroud is positioned at the outlet to the upstream cyclone in such an arrangement. This positioning of the shroud 10, as has been adopted in vacuum cleaners manufactured and sold by Dyson Limited, is illustrated in FIGS. 1a and 1b.

A shroud is commonly formed by providing a wall having a large number of perforations or through-holes which communicate on their upstream side with the separating chamber of the upstream cyclone. The through-holes of the shroud thus form the outlet from the separating chamber. However, as dirt- and dust-laden air is pulled through the shroud, there is a risk that some of the entrained dirt and dust could clog some of the through-holes whilst long, lightweight matter, such as hairs and threads, can become wrapped around the shroud. Blocking the through-holes of the shroud can reduce the efficiency at which the vacuum cleaner operates.

In order to maximise the amount of dirt and dust retained in the separating chamber upstream of the shroud, known shrouds have been provided with a depending lip which projects into the separating chamber. Such a lip is shown and described in EP 0 800 359. This lip has a beneficial effect on the separating apparatus in which the shroud is used in that the risk of the shroud through-holes becoming clogged or blocked is reduced.

SUMMARY OF THE INVENTION

It is an object of the invention to provide a shroud for separating apparatus in which the risk of the through-holes of the shroud becoming blocked by dirt and dust is reduced in comparison to known prior art arrangements.

The invention provides separating apparatus comprising a separating chamber in which cyclonic separation is able to take place, an inlet to the separating chamber and a shroud comprising a wall having a multiplicity of through-holes forming an outlet from the separating chamber, the shroud further comprising a lip extending away from the wall the lip comprising a free distal end projecting into the separating chamber, characterized in that lip has a plurality of apertures therethrough.

The provision of apertures in the depending lip allows the airflow to be drawn through the apertures whilst it is still in the separating chamber. This has the effect of capturing some of the dirt and dust which remains entrained within the airflow so that it collects on the upstream side of the lip. Thus the shroud through-holes (which form the outlet from the separating chamber) are presented with less entrained dirt and dust and the risk of the through-holes becoming blocked is reduced.

Because the lip extends into the separating chamber, the airflow passing through the chamber is not forced to pass through the apertures of the lip. If the apertures become blocked by the collected matter, the airflow simply bypasses that area of the lip without any significant increase in pressure losses.

Preferably, the apertures are spaced from the through-holes by an imperforate portion of the wall and/or lip. More preferably, the breadth of the imperforate portion of the wall and/or lip is at least one tenth of the diameter of the wall of the shroud, even more preferably, substantially equal to one tenth of the diameter of the wall of the shroud.

Providing an imperforate portion of the wall and/or lip between the apertures and the through-holes improves the ability of the apparatus to retain finer dust particles in the separating chamber and thus reduce the risk of the shroud through-holes becoming blocked. It has been found that the effect is improved if the breadth of the imperforate portion is as large as possible whilst still allowing for a sufficient number of perforations to be provided in the lip.

In a preferred embodiment, the combined area of the apertures at the upstream end thereof is no less than, and is preferably greater than, the area of the inlet to the separating chamber. This arrangement ensures that, in an unblocked condition, the airflow is encouraged to pass through the through-holes so as to achieve the desired effect.

Preferably, the apertures in the shroud are tapered, the upstream end of each aperture being of smaller cross-sectional area than the downstream end thereof. This will reduce any risk of the through-holes in the lip from becoming blocked by fine dust particles which would otherwise pass through the through-holes.

Preferably, a second wall is provided radially inwardly of the lip such that a cavity is formed between the second wall and the lip. Previously entrained material which collects on the upstream side of the lip will thus collect in the cavity which, if it is open towards a lower end of the separating chamber, will empty automatically into the separating chamber when the vacuum cleaner is turned off.

BRIEF DESCRIPTION OF THE DRAWINGS

Further advantageous features will become apparent from the following description of embodiments of the invention which are now described with reference to the accompanying drawings in which:

FIGS. 1a and 1b are side views of prior art vacuum cleaners incorporating cyclonic separating apparatus comprising known shrouds;

FIG. 1c is a sectional side view of a detail of part of the separating apparatus of FIGS. 1a and 1b shown on an enlarged scale;

DETAILED DESCRIPTION OF THE INVENTION

Figure 2:
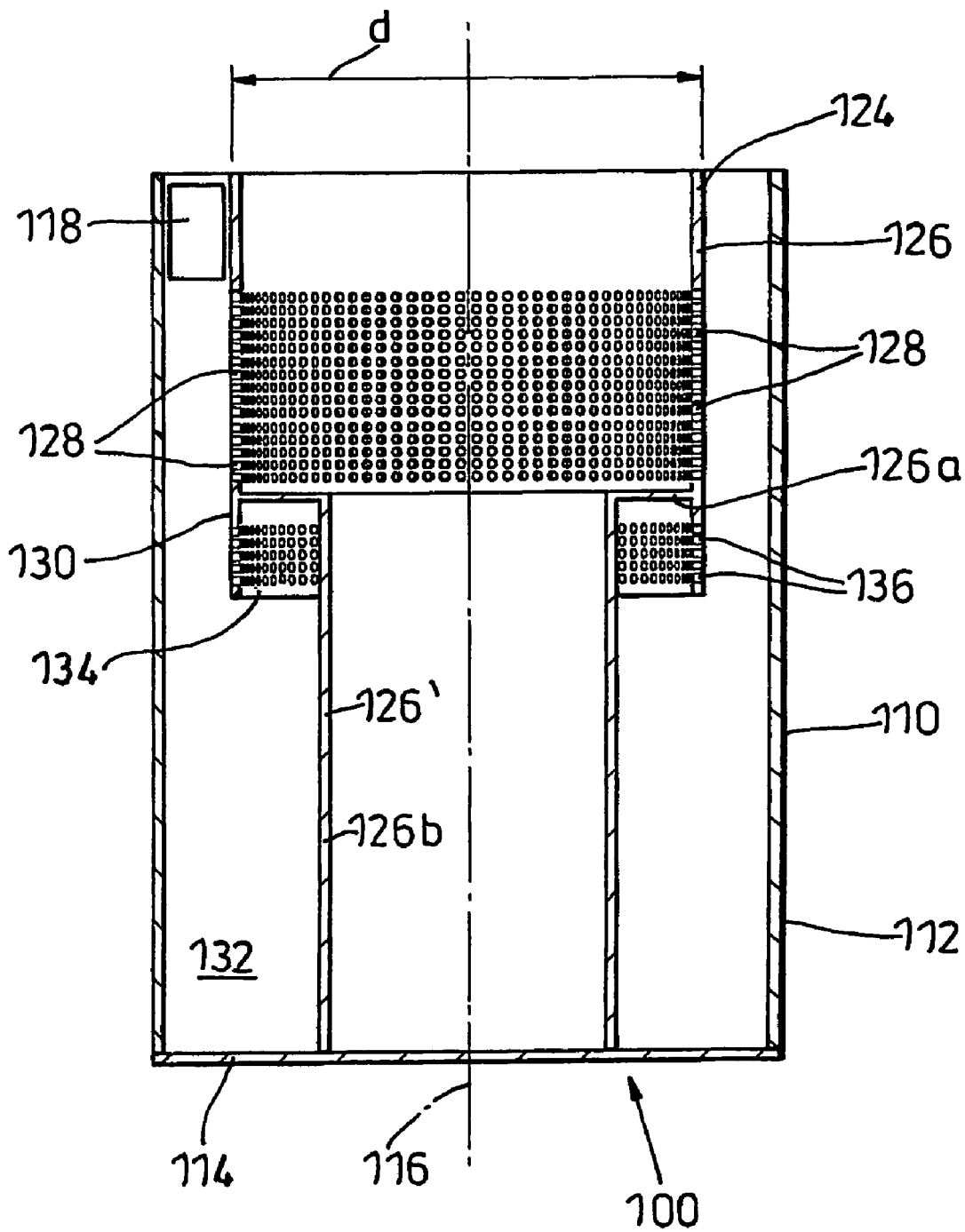
FIG. 2 is a sectional side view of separating apparatus according to the invention.

FIGS. 1a and 1b, as mentioned above, show prior art vacuum cleaners 10, 10' which utilise cyclonic separating apparatus to separate dirt and dust from an airflow. FIG. 1a shows an upright-type cleaner 10 having a main body 12 at the lower end of which a cleaner head 14 is rotatably mounted. Wheels 16 allow the vacuum cleaner 10 to be maneuvered across a floor surface in order to carry out upright cleaning. An upstanding handle 18 facilitates the maneuvering of the cleaner 10 and is also releasable in the manner of a wand to allow above the floor cleaning. This feature is not material to the present invention and will not be described any further here.

The cyclonic separating apparatus 20 is supported on the main body 12. It comprises an upstream, low-efficiency cyclone 22 and a downstream, high-efficiency cyclone (not shown). A shroud 24 is positioned inside the upstream cyclone 22 and perforations therein form an outlet from the upstream cyclone 22. A conduit located inside the shroud 24 communicates with an inlet to the downstream cyclone.

In use, the vacuum cleaner 10 is maneuvered across a surface to be cleaned. A suction fan (not shown) mounted in the main body 12 and driven by a motor (not shown) draws an airflow into the cleaner 10 via the cleaner head 14, from where it passes to the separating apparatus 20. In the separating apparatus 20, the air passes into the upstream cyclone 22 and follows a helical path thus depositing dirt and dust in the upstream cyclone 22. The partially cleaned air then exits the upstream cyclone 22 via the shroud 24 and passes to the downstream cyclone where fine dirt and dust is separated out. The cleaned airflow is then ducted past the motor for cooling purposes and through a final filter (not shown) before exiting the cleaner to atmosphere.

FIG. 1b shows a cylinder cleaner 10' of known construction. The cleaner 10' has a main body or chassis 12' in which a motor (not shown) is housed and having wheels 16' to facilitate the maneuvering of the cleaner 10' across a surface to be cleaned. The separating apparatus 20' is supported on the chassis 12' and has a flexible hose 18' attached thereto so as to allow the incoming airflow to enter the separating apparatus 20'. As in the separating apparatus 20 described above, the separating apparatus 20' includes an upstream cyclone 22', a shroud 24' and a downstream cyclone (not shown), all connected in series.

In use, an airflow is drawn into the cleaner 10' via a floor tool attached to the distal end of the hose 18'. The airflow is passed to the upstream cyclone 22' where larger dirt and debris is deposited, through the shroud 24' and to the downstream cyclone where finer dirt and dust is collected. The cleaner airflow is vented to atmosphere once it has been used to cool the motor.

Each of these prior art machines incorporates a shroud 24, 24' having a wall 26 (see FIG. 1c) which is generally cylindrical in shape and has a large number of perforations or through-holes 28 therethrough. The underside 26' of each shroud 24, 24' separates the downstream side of the through-holes 28 from the respective upstream cyclone 22, 22' and a lip 30 depends from the lower end of the wall 26 into the respective upstream cyclone 22, 22'. The presence of the lip 30 helps to prevent dirt and debris, particularly larger dirt and debris, from passing through the through-holes 28 in the shroud wall 26.

Separating apparatus 100 according to the present invention is shown in FIG. 2. The apparatus 100 includes a cylindrical container 110 having a side wall 112 and a base 114 which closes the lower end of the container 110. The upper end of the container 110 is shown here as being open although, when the apparatus 100 is in use, the upper end of the container 110 will be closed by a cooperating part of the apparatus in which it is located, eg. a vacuum cleaner of the sort shown in FIGS. 1a and 1b. The container 110 has a longitudinal axis 116 and an inlet 118 located near the open upper end of the container 110. The inlet 118 is located tangentially to the side wall 112 so that, when an airflow enters the container, the airflow is caused to follow a helical path about the axis 116. The container 110 and the inlet 118 together form a low-efficiency cyclone forming part of the separating apparatus 100.

The shroud 124 is located concentrically with the axis 116 and is situated at the upper end of the container 110. The shroud 124 has a cylindrical wall 126 in which a multiplicity of perforations or through-holes 128 are arranged. The through-holes 128 are here shown as being arranged in regularly spaced rings, although this specific arrangement is not essential. The shroud 124 has a lower wall 126' which separates the interior of the shroud 124 from the low-efficiency cyclone. The lower wall 126' has an annular portion 126a which projects inwardly from the side wall 112 at a position a little below the lowermost row of through-holes 128. The lower wall 126' also has a cylindrical portion 126b which depends from the annular portion 126a and extends to the base 114 of the container 110. This arrangement divides the lower end of the container 110 into two separate parts.

Depending from the cylindrical wall 126 is a cylindrical lip 130. The lip 130 extends downwardly into the annular separating chamber 132 delimited by the side wall 112 of the container 110, the base 114 of the container 110 and the cylindrical portion 126b of the lower wall 126'. The lip 130 extends parallel to the axis 116 and the proximal end of the lip 130 is rigidly attached to, or integrally formed with, the cylindrical wall 126. The distal end of the lip 130 is spaced from both the side wall 112 and the cylindrical portion 126b. A downwardly-open, annular cavity 134 is thus formed between the lip 130 and the cylindrical portion 126b, the cavity 134 being delimited on the upper side by the annular portion 126a of the lower wall 126'. In the embodiment shown, the length of the lip 130 is greater than the distance between the lip 130 and the cylindrical portion 126b. The cavity 134 is thus deeper than it is wide. Furthermore, the length of the lip is approximately one fifth of the diameter d of the cylindrical wall 126.

Figure 3A:
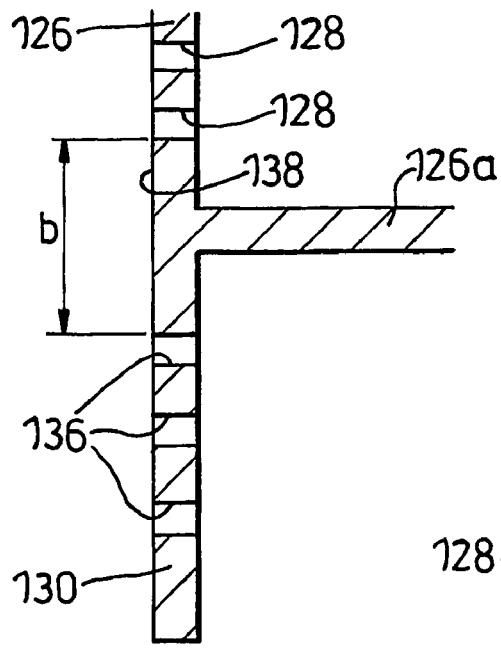
FIG. 3a is a sectional side view, on an enlarged scale, of the lip of the shroud forming part of the apparatus of FIG. 2.

A plurality of apertures 136 are formed in the lip 130. As with the through-holes 128, the apertures 136 are here shown arranged in regularly spaced rings, although again no specific arrangement is necessary. Each aperture provides a passageway from one side of the lip 130 to the other, as is shown more clearly in FIG. 3a. In the embodiment in FIG. 3a, the apertures are parallel-sided, or as close to being parallel-sided as tooling techniques will allow.

Figure 3B:
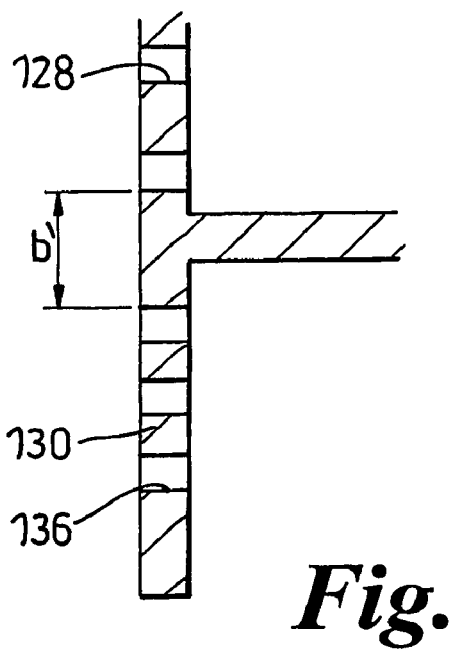
FIG. 3b is a sectional side view, similar to FIG. 3a, of a first alternative lip.

The lowermost through-holes 128 are separated from the uppermost apertures 136 by an imperforate portion 138 formed by part of the wall 126 and part of the lip 130. In the embodiment shown in FIG. 3a, the breadth b of the imperforate portion 138 is greater than one tenth of the diameter d of the cylindrical wall 126 (see FIG. 2). However, in the embodiment shown in FIG. 3b, the breadth b' of the imperforate portion 138' is substantially equal to one tenth of the diameter d of the wall 126. This is the only difference between the embodiments shown in FIGS. 3a and 3b. However, it is important to allow for a sufficient number of apertures 136 to be provided in the lip 130. Tests have shown that providing this imperforate portion 138, 138' improves the efficiency of the separating apparatus as a whole. Reducing the breadth of the imperforate portion 138, 138' below approximately one tenth of the diameter of the wall 126 reduces the beneficial effect provided by the imperforate portion 138, 138'.

Figure 3C:
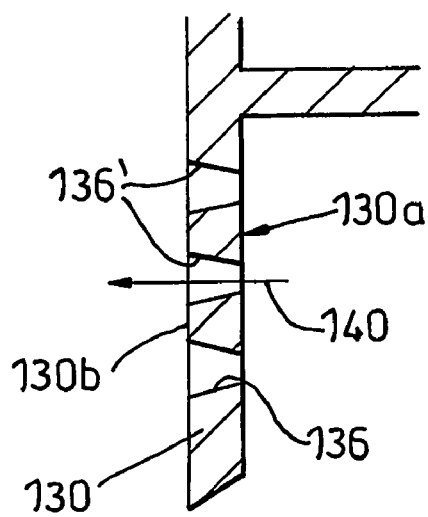
FIG. 3c is a sectional side view, similar to FIG. 3a, of a second alternative lip.

A slightly different embodiment is shown in FIG. 3c. In this embodiment, the shape of the apertures 136' differs from the shape of the apertures 136 described above. The apertures 136' of the embodiment shown in FIG. 3c have a cross-section which increases in the direction of the airflow (illustrated by arrow 140 in FIG. 3c). Thus the cross-sectional area of each aperture is smaller on the upstream side 130a of the lip 130 and larger on the downstream side 130b of the lip 130. This is helpful because the outwardly-tapering shape reduces the risk of any dirt and dust particles becoming lodged inside the apertures 136. The distal end of the lip 130 also has a tapering shape, as is known from the prior art.

In each of the above-described embodiments, the combined area of the apertures 136, 136' in the lip 130 on the upstream side 130a thereof is at least as great as the area of the inlet 118 to the container 110. It is also acceptable for the combined area of the apertures 136, 136' on the upstream side 130a to be greater than the area of the inlet 118. This provides an airflow path which encourages the airflow passing through the container 110 to pass through the apertures 136, 136'.

The operation of the apparatus 100 will now be described with reference to FIG. 2. It will be assumed that the separating apparatus 100 is arranged within a vacuum cleaner or other appliance in which dirt and dust is to be separated from an airflow. The airflow with dirt and dust entrained therein enters the separating apparatus 100 via the inlet 118 and, because of the tangential arrangement of the inlet 118, follows a swirling, helical path about the axis 116. Larger dirt and debris is deposited in the annular separating chamber 132 at the lower end of the container 110 whilst the cleaned air travels inwardly towards the cylindrical portion 126b of the lower wall 126'. The air then follows the lower wall 126b upwardly, still rotating about the axis 116, and enters the cavity 134. It exits the cavity 134 through the apertures 136 in the lip 130 before exiting the separating chamber 132 via the through-holes in the shroud 124. From there, the air can be ducted to a further dirt and dust separator in the form of a cyclone or a filter (not shown).

As the air passes through the apertures 136, dirt and debris particles are collected inside the cavity 134 and retained there. The pressure of the airflow retains the collected debris in the cavity whilst the vacuum cleaner or other appliance is switched on. However, as soon as the appliance is switched off, the collected debris will fall under the influence of gravity into the lower part of the separating chamber 132 from where it can be disposed of along with the other debris collected therein.

In the event that some or all of the apertures 136 of the lip 130 become blocked with dirt and dust, the airflow is able easily to pass around the lowermost end of the lip 130 so as to reach the through-holes 128 forming the outlet from the separating chamber 132. This alternative route to the outlet presents very little increase in the pressure drop developed across the apparatus 100 when the apertures 136 are completely unblocked. Thus, even if the apertures 136 become blocked, there is no significant change in the overall performance of the apparatus, at least initially. It is a further advantage that the apertures 136 are easily accessible for cleaning in the event that they do become blocked.

Figure 4:
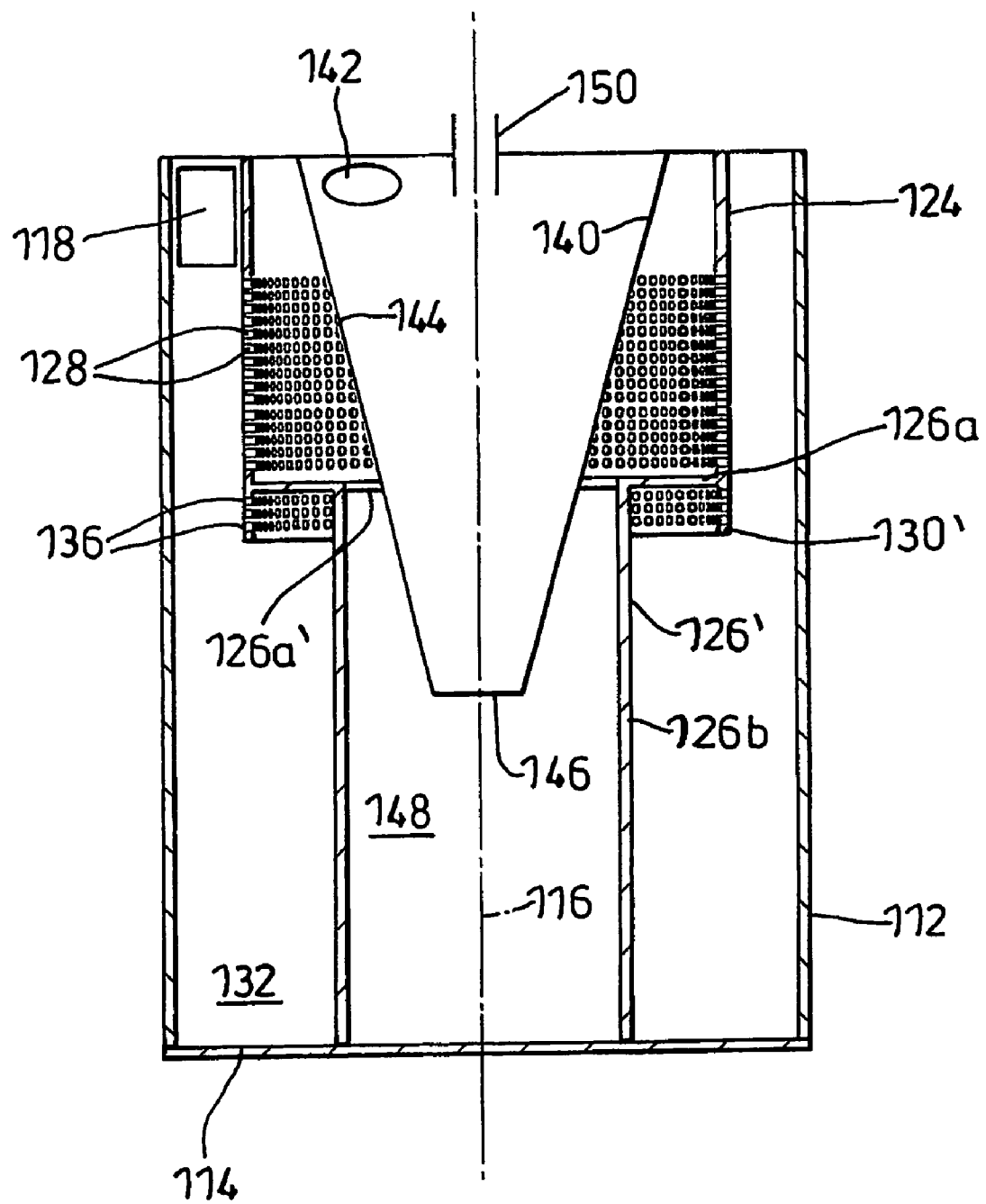
FIG. 4 is a sectional side view, similar to FIG. 2, of a second embodiment of separating apparatus according to the invention.

A further embodiment of the invention is illustrated in FIG. 4. In this embodiment, the lip 130' is shorter than that shown in FIG. 2, being only substantially one tenth of the diameter of the shroud 124 instead of one fifth. The number of apertures 136 in the lip 130' has been reduced, but only to the extent that the combined cross-sectional area of the apertures is no less than the cross-sectional area of the inlet 118 at its point of entry into the container 110. The breadth of the imperforate portion is maintained at no less than one tenth of the diameter of the shroud 124.

A further difference illustrated in FIG. 4 is the presence of a second, high-efficiency cyclone 140 positioned inside the shroud 124. The interior of the shroud 124 communicates with an inlet 142 to the second cyclone 140 so that the air passing through the through-holes 128 is passed to the inlet 142. The inlet 142 is arranged tangentially so that air passing through the inlet 142 will be forced to follow a helical path about the axis 116 within the cyclone 140. The cyclone 140 has a frusto-conical or tapering body 144 which terminates in a cone-opening 146. This cone opening 146 is surrounded by a closed chamber 148 which is delimited by the cylindrical portion 126b of the lower wall 126', the base 114 of the container 110 and an inwardly-extending extension 126a' of the annular portion 126a of the lower wall 126'. The inwardly-extending extension 126a' of the annular portion 126a of the lower wall 126' extends between the annular portion 126a and the tapering body 144 so as to close the chamber 148 and to separate it from the interior of the shroud 124. The second cyclone 140 has an exit 150 arranged centrally of the upper end of the cyclone body 144.

In operation, the apparatus shown in FIG. 4 behaves exactly as the apparatus 100 shown in FIG. 2 and described above, except that, after the airflow has exited the separating chamber 132 via the through-holes 128, it is passed to the inlet 144 to the second cyclone 140. The arrangement of the inlet forces the airflow to spin about the axis 116. Very fine dirt and dust particles still entrained are then separated from the airflow. They fall through the cone opening 146 and collect in the chamber 148 from where they can be disposed of when required. Meanwhile, the cleaned air exits the second cyclone 140 via the outlet 150.

The presence of the lip 130' in the apparatus shown in FIG. 4 means that the risk of larger dirt and debris being present in the airflow entering the second cyclone 140 is reduced. This in turn allows the cyclone 140 to operate under optimum conditions which maximises its performance. Hence, a domestic appliance incorporating apparatus of the type described above will enhance the performance of the appliance.

It will be understood that the invention is not to be limited to the precise details of the embodiments described above. For example, it is not necessary for the shroud to be cylindrical in shape: a tapered shroud could be provided. The lip need not be parallel to the axis of the container or cyclone but could be flared if desired. The apertures and through-holes can be arranged in any pattern, although a regular pattern is preferred. The inlet to the cyclone need not be arranged tangentially but could incorporate vanes or other swirl inducing devices designed to impart the necessary swirl to the incoming airflow. The cylindrical portion of the lower wall could be dispensed with, with the shroud being closed on its lower side simply by way of a circular wall. In the embodiment shown in FIG. 4, the downstream cyclone would then be arranged to terminate above the circular wall. Other variations and modifications will be apparent to a skilled reader.

The invention claimed is:

1. A separating apparatus comprising a separating chamber in which cyclonic separation is able to take place, an inlet to the separating chamber and a shroud comprising a wall having a multiplicity of through-holes forming an outlet from the separating chamber and a lip extending away from the wall, the lip comprising a free distal end projecting into the separating chamber and having a plurality of apertures therethrough.

2. The separating apparatus as claimed in claim 1, wherein the separating chamber has a longitudinal axis and the lip extends substantially parallel to the longitudinal axis.

3. The separating apparatus as claimed in claim 1 or 2, wherein the wall and the lip are generally cylindrical.

4. The separating apparatus as claimed in claim 1 or 2, wherein the apertures are spaced from the through-holes by an imperforate portion of the wall or lip.

5. The separating apparatus as claimed in claim 3, wherein an imperforate portion of the wall or lip has a breadth that is at least one tenth of the diameter of the wall.

6. The separating apparatus as claimed in claim 5, wherein the breadth of the imperforate portion of the wall or lip is equal to about one tenth of the diameter of the wall.

7. The separating apparatus as claimed in claim 4, wherein the combined area of the apertures at an upstream end thereof is no less than the area of the inlet to the separating chamber.

8. The separating apparatus as claimed in claim 4, wherein the combined area of the apertures on an upstream side thereof is greater than the area of the inlet to the separating chamber.

9. The separating apparatus as claimed in claim 4, wherein the length of the lip is at least one tenth of the diameter of the wall of the shroud.

10. The separating apparatus as claimed in claim 9, wherein the length of the lip is at least one fifth of the diameter of the wall of the shroud.

11. The separating apparatus as claimed in claim 4, wherein the apertures are tapered, the upstream end of each aperture being of smaller cross-sectional area than the downstream end thereof.

12. The separating apparatus as claimed in claim 4, wherein a second wall is provided radially inwardly of the lip such that a cavity is formed between the wall, the second wall and the lip.

13. The separating apparatus as claimed in claim 12, wherein the length of the lip is at least as great as the distance between the lip and the second wall.

14. The separating apparatus as claimed in claim 4, wherein the separating chamber is substantially cylindrical in cross-section so as to form a relatively low-efficiency cyclone.

15. The separating apparatus as claimed in claim 14, further comprising a tapering cyclone positioned downstream of the shroud.

16. The separating apparatus as claimed in claim 15, wherein the tapering cyclone has a higher efficiency than the relatively low-efficiency cyclone.

17. A vacuum cleaner incorporating the separating apparatus as claimed in claim 4.

18. The separating apparatus as claimed in claim 3, wherein the apertures are spaced from the through-holes by an imperforate portion of the wall or lip.

19. The separating apparatus as claimed in claim 3, wherein the an imperforate portion of the wall or lip has a breadth that is at least one tenth of the diameter of the wall.

20. The separating apparatus as claimed in claim 3, wherein an imperforate portion of the wall or lip has a breadth that is equal to about one tenth of the diameter of the wall.

* * * * *